United States Patent [19]

Hayes

[11] 3,853,021
[45] Dec. 10, 1974

[54] GRIPPING CAM

[76] Inventor: Roger Hayes, 260 Garth Rd., Scarsdale, N.Y. 10583

[22] Filed: Dec. 26, 1973

[21] Appl. No.: 428,057

[52] U.S. Cl. ........ 74/568 R, 24/261 AC, 74/568 FS, 403/344
[51] Int. Cl. ............................................ F16h 53/00
[58] Field of Search ....... 74/568 R, 568 FS; 24/216, 24/218, 257, 261 AC, 261 G; 287/DIG. 7; 403/344

[56] References Cited
UNITED STATES PATENTS

| | | | |
|---|---|---|---|
| 3,045,506 | 7/1962 | Glasgow | 74/568 R |
| 3,301,089 | 1/1967 | Wechsler | 74/568 R |

Primary Examiner—Samuel Scott
Assistant Examiner—F. D. Shoemaker
Attorney, Agent, or Firm—Gottlieb, Rackman, Reisman & Kirsch

[57] ABSTRACT

A pre-formed length of spring wire for use as a cam element is disclosed. The wire cam is formed into a rounded arc, with an opening defined by two opposed node-like ends. The cam is designed to be mounted around a shaft, and to cooperate with an active element which is moved into and out of contact with the cam, the cam having a periphery of varying radial height above the shaft. By manipulating the cam at its node ends, the cam's position around the shaft may be rotated to provide different travel distances for the active element.

8 Claims, 3 Drawing Figures

PATENTED DEC 10 1974　　3,853,021
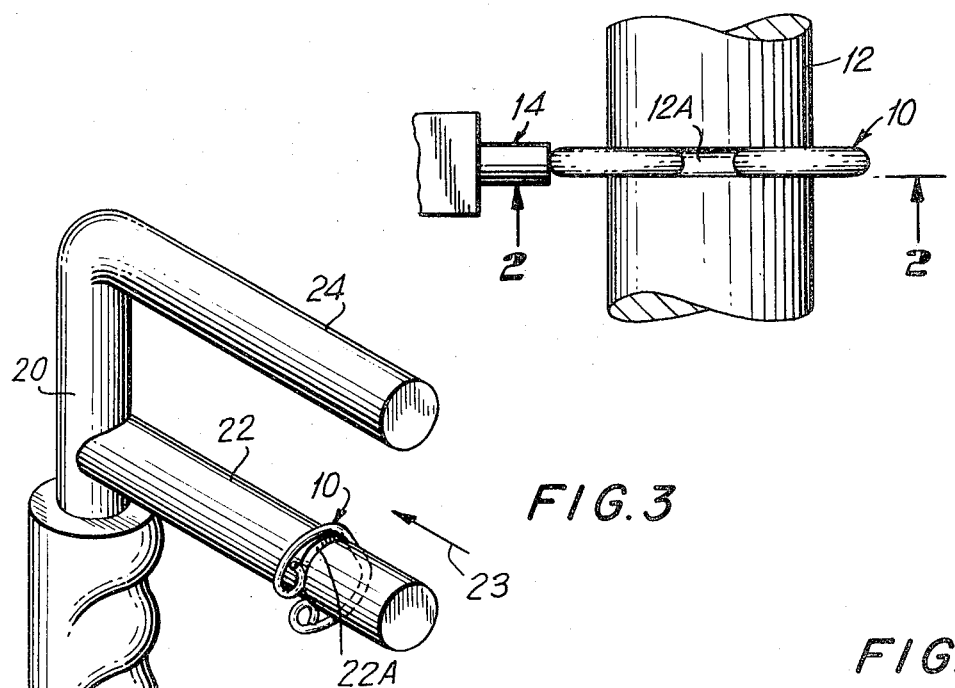
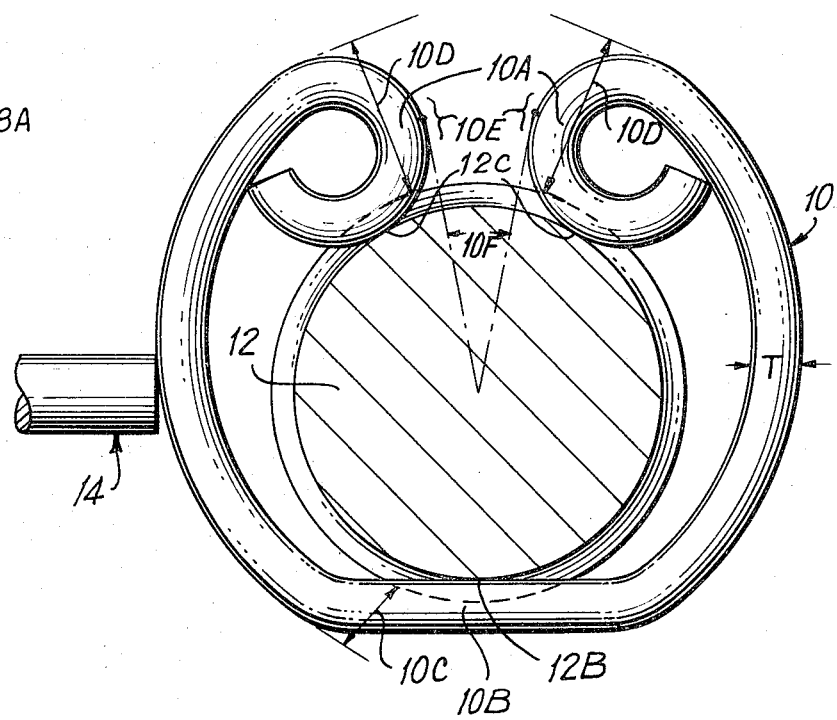

GRIPPING CAM

This invention relates to mechanical apparatus in general, and to cams in particular.

The cam structures disclosed in my co-pending application Ser. No. 289,149, filed Sept. 14, 1972, now U.S. Pat. No. 3,823,707, are fully satisfactory for their intended purposes and function as they were designed to do. But I have found that it is possible to improve on the prior structures in the areas of (a) ease of manufacture of the gripping cam, e.g., on wire forming machinery, (b) smoothness of finish of the edges of the gripping cam, and (c) ease of installation of the gripping cam around a shaft.

In my co-pending application Ser. No. 289,149, one embodiment of the cam takes the form of a split ring disc eccentric around a center hole and with two adjustment nodes formed at the mouth of a radial opening running from the outside periphery of the disc to the hole in the center of the disc. Such a cam configuration is only formable by stamping methods and cannot be produced on spring wire forming machinery. While the gripping cam described in the present application of course will work as described in my co-pending application, it is not intended to be limited to such uses.

It is therefore an object of this invention to provide a gripping cam which can generate discrete heights above a shaft around which it is placed and which cam is adjustable by hand and without the need of tools.

It is also an object of this invention that the configuration of said cam permits it to be manufactured on spring wire forming machinery.

It is a further object of this invention to fabricate said cam of rounded uniform cross-section spring wire without any sharp edges along the cam's periphery.

It is another object of the invention to furnish a cam with as large an elastic limit as possible to permit spreading the cam to facilitate its mounting around a shaft.

These and other objects and advantages of the invention will become apparent when a particular illustrative embodiment thereof is considered, wherein a gripping cam mounted on a shaft and being formed of spring wire of uniform thickness is disclosed. The cam is formed in the general shape of a circular arc, with two opposing nodes facing each other at the break in the circular outline. The nodes may take the form of substantially circular loops which contact the underlying shaft at a particular tangential point. The shaft is formed with a groove into which the nodes of the wire cam fit; in addition to the two tangential node-contacting points, there is another contacting region at a discontinuous segment of the cam, which discontinuous segment may for example take the form of a straight or flattened portion between the loops. This contacting region permits the peripheral arc of the cam to be calibrated with respect to the underlying shaft such that the minimum cam height above the shaft is established.

In the preferred embodiment, the dimension between the shaft contact points and the outer surface of a particular node defines the maximum radial height setting for the cam above the shaft; the distance between the groove and the intersection of the end of the cam arc segment and the flattened calibration surface of the cam defines the minimum radial height. The point on the node where force will generally be applied is arranged to provide the maximum moment arm for movement of the cam around the shaft.

It will also be appreciated from a consideration of applicant's cam invention that the use of applicant's structure, whereby wire of substantially uniform cross-section is utilized, will facilitate installation of the cam around the shaft. The mounting of the cam around a grooved shaft is facilitated by fabricating the cam of spring wire of substantially uniform cross section, since a ring of uniform thickness has a greater elastic limit than one of varying cross section. Accordingly, the spring wire cam is less likely to become deformed in the mounting operation.

As previously noted, the discontinuous or flattened portion of the wire cam functions not only to provide a contact and gripping point between the cam and the shaft but also helps define the range of cam heights above the shaft. Thus, while the shortest travel distance permitted to such interacting member can be based upon the diameter of the looped adjustment mode, the maximum travel distance, defeined by the minimum cam height above the shaft, does not have to be limited to the thickness of the cam wire itself, but rather, can be at least as great as the height of the "corner" formed by the intersection of the discontinuous or flattened calibration section and the section of the arc originating from the looped node.

The cam of one embodiment of this invention is desirably constructed of spring wire which is substantially round in cross-section. This construction has the advantage over a flat-stamped cam of eliminating any sharp edges or surfaces which could have led to problems, such as causing excessive wear to either the stopped element (e.g., the interacting external element) or to the underlying shaft itself in which the groove for carrying the cam is located.

It is therefore a feature of an embodiment of this invention that a cam which is mounted on a shaft and acts to stop an interacting external element is formed of substantially rounded spring wire.

It is also a feature of an embodiment of this invention that a cam formed in the shape of an arc has opposed adjustment nodes at the ends of the arc facing each other and a flattened calibration segment between the nodes of the cam.

It is a further feature of an embodiment of this invention that the maximum radial height above an underlying shaft on which a cam is mounted is defined by the width of an adjustment mode, while the minimum radial height above said shaft is defined by the height above the shaft at the intersection of the flattened calibration portion and an arc segment of the cam originating from a node.

It is still another feature of an embodiment of this invention that a wire cam in the form of an arc and which is mounted on a shaft, is formed with opposed adjustment nodes at the ends of the arc, such that application of operator force to the nodes overcomes the retentive friction forces extered by the cam on the underlying shaft.

It is a further feature of an embodiment of this invention to provide a uniform cross section spring wire cam with a discontinuous segment on its periphery to establish contact between said segment and a shaft on which the cam is mounted, thereby allowing calibration of the slope of the periphery of the cam with respect to the shaft.

These and other objects, features and advantages of this invention will become more readily understood when considered in connection with a presently preferred, but nonetheless illustrative, embodiment of the invention as explained in the following detailed description and as shown in the accompanying drawing, wherein:

FIG. 1 is a plan view, partially broken away, illustrating the basic installation of the cam of this invention on a typical shaft and being contacted by a typical interacting element;

FIG. 2 is an enlarged sectional view, with a fragmentary portion, showing the cam applied to the shaft and residing in the groove therein, taken along the line 2—2 of FIG. 1 in the direction of the arrows; and FIG. 3 is a perspective view of an embodiment of this invention whereby the cam mounted on a shaft functions together with another shaft as a width gauge therebetween.

Initially referring to the plan view of FIG. 1 together with the related sectional view of FIG. 2, there is disclosed a wire gripping cam 10 in accordance with the principles of this invention. The cam is illustrated as being mounted on a cylindrical shaft 12 having a peripheral groove 12A in its outer surface for carrying the cam 10. Groove 12A may be of any suitable depth, such that cam 10 will remain positioned therein and be rotatable around shaft 12. Cam 10 will be most suitably constructed of spring wire, and this will provide an inherent resiliency in the cam such that it can be more easily mounted in "snap-on" fashion around shaft 12 and into groove 12A.

As seen best in FIG. 2, cam 10 is forced substantially in the shape of a circular arc, with pre-formed looped adjustment nodes 10A. These nodes are provided at opposing ends of the arc and in the preferred embodiment loop under the side arc portions of the cam. The looped nodes 10A are shown as being formed in a manner to render cam 10 symmetrical about the central axis of the underlying shaft 12, but such a symmetrical relationship is not a prerequisite to the operation of this invention, nor is it necessary for the nodes to loop under the sides of the cam. At the lower end of cam 10 as illustrated in FIG. 2, there is shown a flattened or straight calibration segment 10B. As will be explained below, this segment permits cam 10 to be calibrated for the range of radial distances that the cam will provide with respect to the external interacting element 14 which will be brought into periodic contact with the cam; segment 10B also provides a lower contact region between cam 10 and shaft 12, with such contact region being designated as 12B and lying at the bottom of groove 12A. The other contact regions between cam 10 and shaft 12, also within groove 12A, are defined by the contacts between each of the nodes 10A and shaft 12, and those contact regions at the upper portion of the illustration of FIG. 2 are designated as 12C.

It should be noted that the geometry of the cam is such that the faces 10E of the nodes 10A define the upper ends of greatest available moment arms 10F for rotation of cam 10. The height of the faces above the shaft provides the nodes 10A with the greatest mechanical advantage to overcome the force of friction generated at regions 12C and 12B. In other words, the nodes 10A provide an operator with a means to generate the greatest possible torque to rotate cam 10 around shaft 12.

Cam 10 is formed of substantially rounded spring wire having a thickness or diameter T. Whereas it would seem that the thickness T of the spring wire would define the minimum radial height above shaft 12A of the arc of cam 10, running from looped adjustment node 10A to segment 10B, in the preferred embodiment applicant's innovation of providing discontinuous segment 10B permits the lower radial height of the arc above shaft 12A to be not only equal to T, but also greater than T. Thus, providing a discontinuity of the cam arc, e.g., flattening the cam 10 at region 10B, permits the cam to be calibrated so that dimension 10C becomes the minimum radial height of cam 10, thereby providing a means to define the slope of the arc of cam 10 as well as the minimum radial height 10C. The largest radial distance, resulting in the smallest stroke distance for interacting element 14, will be defined by the width of each of the adjustment nodes 10A and this widest dimension is designated as 10D in FIG. 2.

Accordingly, as seen in FIG. 2, when cam 10 is rotated approximately 90° clockwise, dimension 10C will be brought adjacent to interacting element 14 and will provide element 14 with the greatest controlled travel distance in a left-to-right dimension with respect to shaft 12. On the other hand, should cam 10 be rotated approximately 90° counterclockwise, dimension 10D of the left adjustment node 10A will be brought adjacent to interacting element 14 and will cause element 14 to travel the shortest distance in a left-to-right dimension as it approaches shaft 12. These are the two extremes of the range of movements defined for interacting element 14 by the geometrical shape of cam 10.

In order to realize the significance of the calibration feature mentioned above, the mathematics for optimizing the above-mentioned structure in the preferred embodiment is discussed herein. The critical parameters for the cam are:

$M$ = maximum cam height
$L$ = minimum cam height
$T$ = a certain thickness of spring wire where $L > T$.

Furthermore, if we define S as the radial slope between M and L, and R as the contact region between the two nodes which is necessary for the cam to grasp the shaft, it is found that in order to optimize (i.e., minimize) the slope S between M and L, there must be a discontinuity between L on the cam and R. This is because the cam must contact the shaft along region R and because for a finite distance, R must equal T and it has been given that $L > T$. For example, if it is required that M be 0.250 inch, L be 0.150 inch and T be 0.071 inch for a particular cam, the design of a gradual slope between M and L while still terminating the arc at R, requires a discontinuity after L and before R, e.g., a flat segment.

The spring wire utilized to fabricate cam 10 can be substantially round in shape, thereby eliminating any sharp edges or surfaces which may have caused a problem in the past. Equally as significant, the cross section of such wire, having a diameter designated as T in FIG. 2, is substantially uniform, and this aids cam 10 to be readily mounted on shaft 12 and to be snapped into groove 12A. Because the substantially uniform cross-section of the wire of cam 10 has, a greater elastic limit when spread for mounting in comparison to flat metal discs which are described in my above-identified co-pending application, the stress applied to expand a ring formed of wire of substantially uniform cross section is substantially uniform throughout the length of the wire, whereas with respect to a nonuniform cross section disc, the stress is unevenly applied and thereby may cause fractures more easily.

The drawing of FIG. 3 demonstrates an alternative application for the cam disclosed in this application. A gauge 16 is depicted which has a handle 18 connected by a member 20 to two parallel arms 24 and 22. By installing the cam 10 previously disclosed herein within groove 22A on shaft 22, the apparatus 16 becomes a manually adjustable thickness gauge, variable by the rotation of eccentric cam 10 about shaft 22; this varies the gap between cam 10 and cam 24. Element 23 symbolizes a part to be tested by gauge 16. First the gauge is set by establishing a "standard" gap between arm 24 and cam 10 by rotating the cam; thereafter, all samples can be checked against this standard setting upon insertion into apparatus 16.

Applicant has disclosed herein a cam structure having the capacity to both control the travel distance of an external member and also to measure the distance between a fixed member and a variable cam contacting surface. In addition to the width gauge application illustrated in FIG. 3, the arrangement disclosed in FIGS. 1 and 2 is of even more general application. For example, the cam is applicable wherever it is desired to provide a limiting stop for a variably moving element. Typical examples of the application of applicant's cam would be to spray guns and torches, and any other apparatus where an external element is adapted to move, e.g., by reciprocation, towards a shaft-like element for adjustable travel distances. In such situations, applicant's cam can be mounted on the shaft and the travel distance for an external element can be adjusted by rotating the cam around the shaft as has been described herein, thereby providing a range of presettable stroke distances for the external element.

It is also to be understood that the above described embodiments are merely illustrative of the application of the principles of this invention. Numerous variations may be devised by those skilled in the art without departing from the spirit or scope of the invention.

What is claimed is:

1. A ring, formed of spring wire and mounted in a groove around a shaft, adapted for stopping the movement of a member movable towards and away from said ring on said shaft, said ring having a pair of opposed ends defining an opening in the periphery of said ring, and at least three locations for contacting and gripping said shaft in said groove to prevent axial movement of said ring with respect to said shaft and to establish a gripping force around said shaft to prevent free rotation of said ring around said shaft, at least one of said ends having a loop for providing a region to receive rotational force to overcome said gripping force and thereby to rotate said ring, said periphery of said ring defining a variable radial height dimension of said ring above said shaft when said ring is mounted on said shaft, said ring having a plurality of external contacting regions corresponding to said variable radial height dimension for limiting the movement of said movable member towards said periphery of said ring and towards said shaft, the selection of said contacting region of said ring for stopping said movable member being variably determined by the rotational position of said ring with respect to the path of said movable member in said movement towards said periphery of said ring.

2. A ring as defined in claim 1 wherein said loop of at least one of said ends is curved inwardly to form one of said contacting and gripping locations, and said force-receiving region of each of said ends permits the application of pressure to create a rotational torque for said ring with respect to said shaft.

3. A ring as defined in claim 1 including one of said loops on each of said ends, and wherein two of said contacting and gripping regions are formed by said loops, and the third of said contacting and gripping regions is formed between said loops along said periphery.

4. A ring as defined in claim 3 wherein said periphery of said ring varies from a maximum radial height above said shaft at each of said loops to a minimum radial height above said shaft at said third contacting and gripping region.

5. A ring as defined in claim 1 wherein said spring wire is of substantially uniform cross-section.

6. A ring as defined in claim 5 wherein said cross-section is substantially circular.

7. A ring as defined in claim 5 wherein said cross-section is formed with no discrete angular edges.

8. A ring as defined in claim 1 including a calibration segment at the junction of said periphery and one of said contacting and gripping locations for defining a radial height dimension of said ring above said shaft to allow the maximum travel distance of said movable member toward said shaft, said radial height dimension corresponding to said maximum travel distance adapted to equal or exceed the thickness of said spring wire.

* * * * *